Feb. 17, 1959   J. H. CRANKSHAW   2,873,589
FLEXIBLE COUPLING SLEEVE WITH SPACER CONNECTION
Filed Oct. 24, 1955

INVENTOR.
JOHN H. CRANKSHAW
BY

United States Patent Office 2,873,589
Patented Feb. 17, 1959

2,873,589

FLEXIBLE COUPLING SLEEVE WITH SPACER CONNECTION

John H. Crankshaw, Erie, Pa., assignor to American Flexible Coupling Company, Erie, Pa., a corporation of Pennsylvania Application October 24, 1955, Serial No. 542,144

5 Claims. (Cl. 64—9)

This invention relates to couplings and more particularly to toothed couplings.

In gear type couplings, it is frequently desirable due to design considerations to make certain parts of the coupling from aluminum or other soft metal while other parts are made of steel and to connect the part made of aluminum to the steel part in a positive manner. Since the tensile and bending strength of aluminum is low, problems have been encountered in this type of coupling in transmitting the load from the hard steel member to the soft aluminum member.

It is, accordingly, an object of this invention to provide a means for coupling a steel member to a soft metal member wherein the coupling means is simple in construction, efficient to use, and economical to manufacture.

Another object of this invention is to provide an improved coupling member between a gear coupling and a sleeve member wherein the coupling is made of hard metal and the sleeve is made of soft metal.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 2:
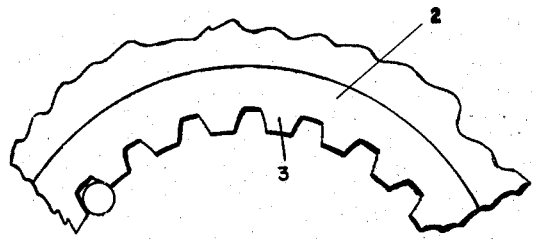
Fig. 2 is a broken view showing the end of the spline teeth shown in Fig. 1.
Figure 1:
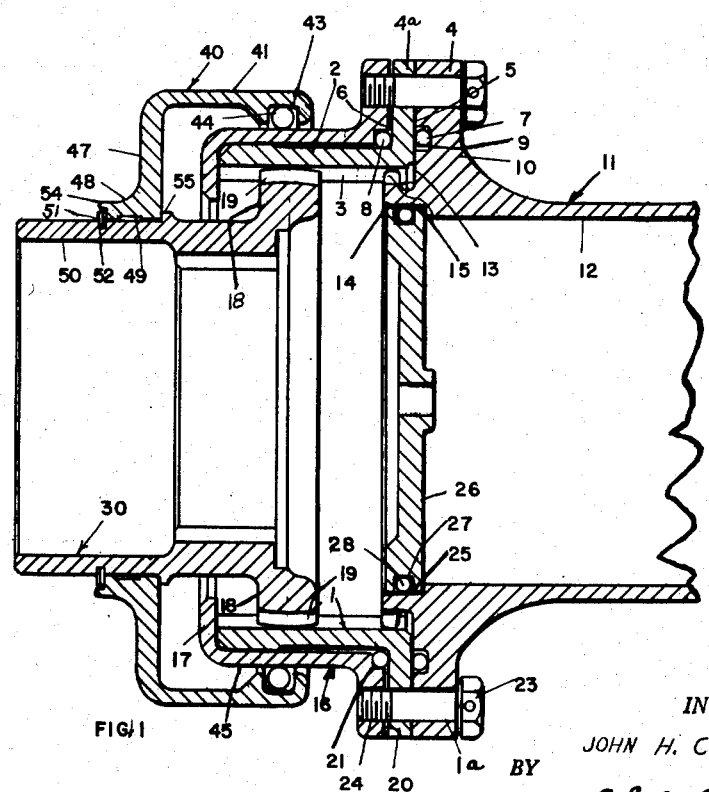
Fig. 1 is a cross sectional view of a coupling according to the invention.

Now with more specific reference to the drawing, a coupling sleeve 1 is shown having a cylindrical portion 2 with internal splined teeth 3 disposed around the inner periphery thereof. A flanged portion 4a extends radially from one end thereof to provide seating surfaces 5 for O-shaped packing washers 7. The washer 7 is disposed in a groove 9 cut in the end surface of the flange 4 integrally connected to the sleeve 11 at 10 and extending around concentric to a bore 12 of the sleeve 11, thereby providing a seal against the escape of grease between the surface 5 of the sleeve 1 and end surface 13 of the sleeve 1.

The sleeve 11 has an outwardly extending portion 14 having spaced teeth 15 disposed around the periphery thereof and a clearance groove is provided between the surface 13 and the teeth 15. The teeth 15 are adapted to engage the internal splined teeth 3 to transmit force between the flange 10 and the coupling sleeve 1. A retainer member 16 having an inwardly directing flange 17 which overlies an end 18 of hub teeth 19 is provided around the sleeve 1 and a flat surface is provided on the end of the retainer member 16 having a groove 21 therein which receives the O-shaped packing washer 8. The hub teeth 19 are crowned; that is, the tips thereof have surfaces conforming to the surface of a sphere and the flanks thereof are curved or crowned in the manner disclosed in Patent No. 2,682,760. Spaced bolts 23 extend through holes 1a in the flange 4 and through holes 20 in the flanged portion 4a of the coupling sleeve 1 and engage threaded holes 24 in the retainer member 16, thereby clamping the retainer member 16, the flange 10 of the sleeve 11, and the sleeve member 11 together with the O-shaped washers 7 and 8 therebetween providing a seal against leakage. A counterbore 25 is formed in the end of the sleeve bore 12 which receives a plate 26 having a peripheral groove 27 therein which receives an O-shaped washer 28. The plate 26 thereby forms a closure for the end of the bore 12 of the sleeve 11 to prevent dirt and grease entering.

A hub 30 having the crowned teeth 19 thereon is disposed concentrically inside the sleeve 1 and the crowned teeth 19 are adapted to be received by the splined teeth 3 and retained against withdrawal therefrom by the overlying flange 17. A grease retaining flanged member 40 has an overlying portion 41 which lies over the retaining member 16 and an inner peripheral groove 43 has an O-shaped washer 44 therein which forms a seal against leakage with the outer surface 45 of the retainer member 16. The member 40 has an inwardly directed flange 47 which terminates in an axially extending portion 48 having a bore 49 therein which slides over the outer surface 50 of the hub 30. A spring clip washer 51 is disposed in a groove 52 in the hub 30 and received under a counterbored portion 54 to hold the retainer member 40 against a shoulder 55 in firm engagement therewith and against withdrawal therefrom.

In operation, the hub 30 may be driven in misalignment with the sleeve 1 to transmit force between the sleeve 11 and the hub 30 and force being transmitted will be transmitted between the teeth 15 and the teeth 3 rather than by the bolts 23 which connect the sleeve 1 with the sleeve 11. Therefore, a considerably greater area of contact will be maintained between the teeth 3 and the teeth 15 than would be possible between the bolts 23 and holes 1a and, therefore, the soft material of the sleeve 11 will not be damaged by load concentration of the engaging teeth.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A flexible coupling comprising a hollow sleeve, external gear teeth on the end of said sleeve, a coupling sleeve having internal coupling sleeve teeth thereon, said internal coupling sleeve teeth engaging said hollow sleeve teeth, means to clamp said coupling sleeve and said hollow sleeve together, a crowned tooth hub disposed in said coupling sleeve with the crowned teeth thereon engaging the teeth on said coupling sleeve whereby a shaft driven by said hub may be operated out of alignment with the axis of said hollow sleeve, said means to clamp said hollow sleeve to said coupling sleeve comprising a retainer member extending concentric to said coupling sleeve, an outwardly directed flange on said hollow sleeve, an outwardly directed flange on said coupling sleeve, bolts extending through said flanges and said retainer member locking said members together, grooves formed in the outer end of one said flange, and O-shaped packing washers disposed in the grooves in said flange and disposed between said hollow sleeve flange and said coupling sleeve flange whereby a seal is provided therebetween.

2. A flexible coupling comprising a cylindrical sleeve having an outwardly directed flange at one end thereof, outwardly directed teeth on said sleeve axially spaced from said flange, a coupling sleeve having internal teeth engaging said cylindrical sleeve teeth, an outwardly directed flange on one end of said coupling sleeve, sealing means between said coupling sleeve flange and said hollow member flange, a hub having crowned teeth engaging said coupling sleeve teeth, a retainer member disposed on said hub, said retainer member having an inwardly directed flange overlying said hub teeth and limiting their axial movement, said retainer member having an outwardly directed flange engaging said coupling sleeve, and bolts extending through said hollow member flange, said coupling sleeve flange, and said retainer flange.

3. The flexible coupling recited in claim 2 wherein a grease retaining flanged member has a cylindrical portion overlying said retainer member, an internal peripheral groove in said overlying portion, an O-ring disposed in said overlying portion of said grease retaining member and sealingly engaging the outer periphery of said retaining member, said grease retaining member having an inwardly directed portion on the distal end thereof, said inwardly directed portion being attached to said hub outwardly of said teeth.

4. A coupling comprising a hub having external teeth thereon, a coupling sleeve having internal teeth and an outwardly directed flange, a shaft having an outwardly directed flange extending radially therefrom, said shaft flange being bolted to said coupling sleeve flange, and an end portion of said shaft extending into said coupling sleeve, and external teeth on said end portion engaging said coupling sleeve teeth.

5. The coupling recited in claim 1 wherein a flanged member is attached to said hub and extends over said retainer member and sealing means is provided between said flanged member and said retainer member.

References Cited in the file of this patent

UNITED STATES PATENTS

| | | |
|---|---|---|
| 2,332,068 | Fast | Oct. 19, 1943 |
| 2,682,760 | Shenk | July 6, 1954 |